United States Patent
Oh et al.

(10) Patent No.: US 9,561,965 B2
(45) Date of Patent: Feb. 7, 2017

(54) METHOD FOR HYDROGENATING HIGHER HALOGEN-CONTAINING SILANE COMPOUNDS

(71) Applicants: Min-Zae Oh, Cologne (DE); Jens Haubrock, Duelmen (DE); Thorsten Schwaertzke, Marl (DE); Imad Moussallem, Hanau (DE); Martin Trocha, Essen (DE)

(72) Inventors: Min-Zae Oh, Cologne (DE); Jens Haubrock, Duelmen (DE); Thorsten Schwaertzke, Marl (DE); Imad Moussallem, Hanau (DE); Martin Trocha, Essen (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 14/649,092

(22) PCT Filed: Nov. 27, 2013

(86) PCT No.: PCT/EP2013/074877
§ 371 (c)(1),
(2) Date: Jun. 2, 2015

(87) PCT Pub. No.: WO2014/095278
PCT Pub. Date: Jun. 26, 2014

(65) Prior Publication Data
US 2015/0307363 A1    Oct. 29, 2015

(30) Foreign Application Priority Data
Dec. 21, 2012 (DE) .................. 10 2012 224 202

(51) Int. Cl.
*B01J 29/90* (2006.01)
*C01B 33/04* (2006.01)
*C01B 3/00* (2006.01)
*C01B 33/107* (2006.01)

(52) U.S. Cl.
CPC ............ *C01B 33/04* (2013.01); *C01B 3/0015* (2013.01); *C01B 33/107* (2013.01); *Y02E 60/328* (2013.01)

(58) Field of Classification Search
CPC ............ B01J 29/90; B01J 23/96; C01B 33/04
USPC ......................................... 423/347
See application file for complete search history.

(56) References Cited

U.S. PATENT DOCUMENTS

| | | | |
|---|---|---|---|
| 4,601,798 | A | 7/1986 | Jacubert et al. |
| 4,725,419 | A | 2/1988 | Marlett et al. |
| 8,741,253 | B2 | 6/2014 | Brausch et al. |
| 9,011,812 | B2 | 4/2015 | Brausch et al. |
| 9,017,630 | B2 | 4/2015 | Wieber et al. |
| 2011/0158883 | A1 | 6/2011 | Holl et al. |
| 2013/0259791 | A1 | 10/2013 | Brausch et al. |

FOREIGN PATENT DOCUMENTS

| | | |
|---|---|---|
| DE | 10 2010 063 823 | 6/2012 |
| JP | 2000 256367 | 9/2000 |
| WO | 2012 084897 | 6/2012 |
| WO | 2012 087653 | 6/2012 |

OTHER PUBLICATIONS

German Search Report Issued Oct. 30, 2013 in German Patent Application No. 10 2012 224 202.3 Filed Dec. 21, 2012.
International Search Report Issued Feb. 11, 2014 in PCT/EP2013/074877 Filed Nov. 27, 2013.

*Primary Examiner* — Edward Johnson
(74) *Attorney, Agent, or Firm* — Oblon, McClelland, Maier & Neustadt, L.L.P.

(57) ABSTRACT

The present invention relates to a continuous process for hydrogenating halogen-containing silane compounds having at least three silicon atoms, in which at least one halogen-containing silane compound having at least three silicon atoms and at least one hydrogenating agent are converted continuously to form at least one hydridosilane compound having at least 3 silicon atoms and oxidized hydrogenating agent, and wherein oxidized hydrogenating agent is withdrawn and reduced, and the reaction product of this reduction reaction is sent back to the hydrogenation, to the hydridosilane compounds obtainable by this process and to the use thereof.

11 Claims, 1 Drawing Sheet

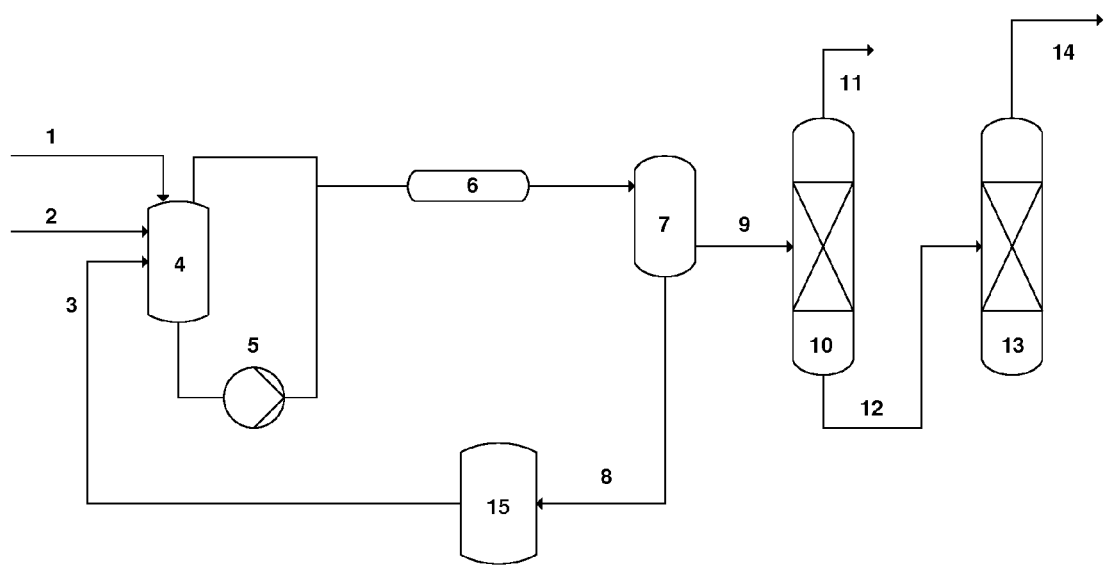

METHOD FOR HYDROGENATING HIGHER HALOGEN-CONTAINING SILANE COMPOUNDS

The present invention relates to a continuous process for hydrogenating higher halogen-containing silane compounds to higher hydridosilane compounds. More particularly, the present invention relates to the hydrogenation of dodecachloroneopentasilane to neopentasilane.

Hydridosilanes and hydridosilane compounds have been described in the literature as possible reactants for the production of silicon layers. Hydridosilanes are understood to mean compounds containing essentially only silicon and hydrogen atoms. Hydridosilane compounds may, as well as silicon and hydrogen atoms, also have further radicals, especially alkyl radicals, boraalkyl radicals, phosphaalkyl radicals, —$BH_2$ radicals or $PH_2$ radicals. Hydridosilanes may be gaseous, solid or liquid and are—in the case of solids—essentially soluble in solvents such as toluene or cyclohexane or in liquid silanes such as cyclopentasilane. Examples include monosilane, disilane, trisilane, cyclopentasilane and neopentasilane. Hydridosilanes having at least three or four silicon atoms may have a linear, branched or (optionally bi-/poly-)cyclic structure having Si—H bonds and can be described by the respective generic formulae $Si_nH_{2n+2}$ (linear or branched; where n≥2), $Si_nH_{2n}$ (cyclic; where n>3) or $Si_nH_{2(n-i)}$ (bi- or polycyclic; n≥4; i={number of cycles}−1). Hydridosilanes having at least three silicon atoms are referred to as higher hydridosilanes. Because of their liquid or solid state of matter, they have the advantage that there is no need to use any high-pressure processes in the preparation thereof; instead, it is possible to work in liquid or solid phases which are easier to handle industrially. In addition, higher hydridosilanes and higher hydridosilane compounds have the advantage that they can be used to produce good silicon-containing layers via liquid phase processes.

Many processes for preparing higher hydridosilanes are based on a dehydropolymerization reaction of lower hydridosilanes, especially $SiH_4$, to give higher silanes with formal elimination of $H_2$. This dehydropolymerization reaction can be performed 1) thermally (U.S. Pat. No. 6,027,705 A if no catalyst is used) and/or 2) through use of catalysts such as a) elemental transition metals (heterogeneous catalysis; U.S. Pat. No. 6,027,705 A if platinum group metals, i.e. Ru, Rh, Pd, Os, Ir, Pt, are used; U.S. Pat. No. 5,700,400 A for metals of groups 3B-7B and 8—i.e. the transition metals/lanthanides except for Cu and Zn groups), b) non-metal oxides (heterogeneous catalysis; U.S. Pat. No. 6,027,705 A if $Al_2O_3$ or $SiO_2$ is used), c) hydridic cyclopentadienyl complexes of scandium, yttrium or rare earths (homogeneous catalysis; U.S. Pat. No. 4,965,386 A, U.S. Pat. No. 5,252,766 A), d) transition metal complexes (homogeneous catalysis; U.S. Pat. No. 5,700,400 A for complexes of the metals of groups 3B-7B and 8—i.e. the transition metals/lanthanides except for Cu and Zn groups; JP 02-184513 A) or e) particular transition metals immobilized on a support (heterogeneous catalysis; U.S. Pat. No. 6,027,705 A if platinum group metals on a support, for example $SiO_2$, are used, U.S. Pat. No. 5,700,400 A for carbon-, $SiO_2$— or $Al_2O_3$-immobilized ruthenium, rhodium, palladium or platinum) or transition metal complexes (heterogeneous catalysis, U.S. Pat. No. 6,027,705 A if platinum group metal complexes on a support, for example $SiO_2$, are used). However, all these processes have the disadvantage that the lower hydridosilanes used first have to be prepared in a complex manner. A further disadvantage of these processes is that they entail a high level of apparatus complexity because of the autoignitability of the reactants. Finally, these processes have not achieved sufficiently high yields to date. Furthermore, complex purification is required.

Another process for preparing higher hydridosilanes, in which dihalosilanes, optionally together with trihalosilanes and/or tetrahalosilanes, are converted by an electrochemical route is described, for example, by EP 0 673 960 A1. This process too, however, has the disadvantage that it entails a high level of apparatus complexity and additionally high energy densities because of the electrochemical reaction regime. Finally, the respective di- and/or trihalosilanes first have to be prepared in a complex manner here too.

Alternatively, it is also possible to prepare higher hydridosilanes by dehalogenation and polycondensation of halosilanes with alkali metals (GB 2 077 710 A). However, this process does not lead to sufficiently high yields. Furthermore, this process is only of low selectivity.

A synthesis of higher hydridosilane compounds preferred over the syntheses outlined so far involves the hydrogenation of halogen-containing silane compounds, especially of halosilanes.

The synthesis of halogen-containing silane compounds forms part of the prior art. Various possibilities for hydrogenation thereof to hydridosilanes have already been described in the prior art.

The catalytic formation of higher chlorosilanes from lower chlorosilanes, especially the formation of pentasilicon dodecachloride (the chlorine analogue of neopentasilane, $Si(SiH_3)_4$), is described, for example, by A. Kaczmarczyk et al., J. Inorg. Nucl. Chem., 1964, Vol. 26, 421-425 and G. Urry, J. Inorg. Nucl. Chem., 1964, Vol. 26, 409-414. For instance, A. Kaczmarczyk et al., J. Inorg. Nucl. Chem., 1964, Vol. 26, 421-425 teaches the synthesis of pentasilicon dodecachloride from hexachlorodisilane to form tetrachlorosilane. It is additionally stated therein that, in the case of a corresponding use of octachlorotrisilane, pentasilicon dodecachloride and hexachlorodisilane are formed. The catalyst used therein is trimethylamine. G. Urry, J. Inorg. Nucl. Chem., 1964, Vol. 26, 409-414 teach the trimethylamine-catalysed synthesis of pentasilicon dodecachloride from hexachlorodisilane to form tetrachlorosilane, or from octachlorotrisilane to form hexachlorodisilane. However, the hydrogenation of the products to hydridosilanes is not described therein.

DE 195 02 550 A1 and JP S63-008207 A1 describe the hydrogenation of silicon tetrachloride with hydrogen gas to give monosilane. These processes, however, require temperatures of 600° C. or more and have to be performed under pressure. Moreover, the handling of hydrogen gas is complex and thus disadvantageous. Finally, the suitability of this method for formation of higher hydridosilanes is not disclosed.

EP 2 132 137 A1 describes a process for catalytic hydrogenation of silicon halides to monosilane or halogenated monosilane derivatives, or higher hydridosilanes or higher halogenated hydridosilane compounds, in which, in a first step, a Lewis acid-base pair is hydrogenated with addition of $H_2$, which, in a second step, is used for hydrogenation and, in a third step, is regenerated with separation of hydrogen halide. The process is a batchwise process. These processes have the disadvantage that, on completion of the reaction, the product has to be separated from the by-products which likewise form, and cleaning of the apparatus is required. During this time, the reaction vessel is not available for another synthesis. A further disadvantage is that the process does not lead to sufficiently high yields.

U.S. Pat. No. 4,601,798 A describes a continuous process for preparing $SiH_4$, in which, inter alia, a hydrogenation of $SiCl_4$ to $SiH_4$ with metal hydrides such as lithium hydride is performed. The suitability of this process for higher halosilanes is not disclosed therein. A further disadvantage of the process disclosed is that it is performed in a salt melt and hence with great apparatus complexity. It is likewise disadvantageous that the lithium chloride formed is worked up electrochemically and hence in a costly and energy-intensive manner.

JP 2003-119200 A discloses the reduction of halogen-containing monosilane derivatives or higher halogen-containing silanes with sodium borohydride. However, a disadvantage here too is that this is a batchwise process. Furthermore, the process described leads only to low yields and a large amount of by-products, which have to be removed in a costly and inconvenient manner.

WO 2008/051328 A1 teaches producing neopentasilane-containing compositions by converting a hexahalodisilane of the formula $X_3SiSiX_3$ with a tertiary amine catalyst to form a first mixture comprising tetrakis(trihalosilyl)silane ($Si(SiX_3)_4$) and tetrahalosilane. The two main constituents, tetrakis(trihalosilyl)silane and tetrahalosilane, can be separated from one another. The tetrakis-(trihalosilyl)silane obtained can be converted by hydrogenation with diisobutylaluminium hydride to neopentasilane ($Si(SiH_3)_4$). The hydrogenation process disclosed therein is a batchwise process. Furthermore, this process has the disadvantage of leading to insufficiently high yields in relation to the halosilane used.

DE 10 2009 053 804 A1 and DE 10 2010 063 823 A1 also describe processes for preparing higher hydridosilanes, especially neopentasilane. In the process according to DE 10 2009 053 804 A1, at least one halosilane of the generic formula $Si_nX_{2n+2}$ and at least one catalyst are converted to form a mixture comprising at least one halosilane of the generic formula $Si_mX_{2m+2}$ (where m>n and X=F, Cl, Br and/or I) and $SiX_4$ (where X=F, Cl, Br and/or I), and the at least one halosilane of the generic formula $Si_mX_{2m+2}$ is hydrogenated to form a hydridosilane of the generic formula $Si_mH_{2m+2}$. In the process according to DE 102010063823 A1, hydridosilane formed is separated from partially halogenated hydridosilanes likewise formed, and the latter are optionally hydrogenated again. However, a disadvantage here is that, because of the additional hydrogenation step, oxidized hydrogenating agent is now obtained as waste in two hydrogenation steps, and this either contaminates or dilutes the reaction product or has to be removed and disposed of in a costly and inconvenient manner.

It is thus an object of the present invention to avoid the disadvantages of the prior art. More particularly, it is an object of the present invention to provide a process for hydrogenating higher halogen-containing hydridosilane compounds, which leads to hydridosilane compounds with use of easily manageable techniques and with particularly high yields.

This object is achieved in the present context by a continuous process for hydrogenating halogen-containing silane compounds having at least three silicon atoms, in which
  at least one halogen-containing silane compound having at least three silicon atoms and
  at least one hydrogenating agent
  are converted continuously
to form
  at least one hydridosilane compound having at least three silicon atoms and
  oxidized hydrogenating agent,
  in which oxidized hydrogenating agent is withdrawn and reduced, and the reaction product of this reduction reaction is fed back to the hydrogenation.

The halogen-containing silane compounds for use in accordance with the invention may preferably be understood to mean linear, branched or cyclic compounds of the formulae $Si_nX_{2n+2-z}Y_z$ (where n≥3; 0≤z≤2n; X=F, Cl, Br, I; Y=H, $C_1$-$C_{10}$-alkyl, $BH_2$, $PH_2$) and $Si_nX_{2n-z}Y_z$ (where n≥4; 0≤z≤2n−2; X=F, Cl, Br, I; Y=H, $C_1$-$C_{10}$-alkyl, BH, PH). The terms "linear", "branched" and "cyclic" are understood to mean attributes relating to the arrangement of the silicon atoms. "$C_1$-$C_{10}$-Alkyl" radicals are additionally understood here and hereinafter to mean alkyl radicals having 1 to 10 carbon atoms, which may optionally in turn have boron or phosphorus atoms.

The process according to the invention can be performed particularly efficiently with halogen-containing silane compounds of the generic formula $Si_nX_{2n+2}$ where 3≤n≤10 and X=F, Cl, Br, I. One of the resulting advantages is that the respective $Si_nH_{2n+2}$ products formed here are liquid and can be removed in a particularly simple manner.

The reaction is of particularly good controllability when the reactant used is $Si_5Cl_{12}$ (dodecachloroneopentasilane).

The proportion of the at least one halogen-containing silane compound used in the reactant streams fed in before commencement of the hydrogenation is preferably 10-30% by weight, more preferably 15-27% by weight, based on the total mass of the components fed in (especially halogen-containing silane compound, hydrogenating agent and any solvent present). Thus, a particularly good reaction yield can be achieved. In addition, given these values, the reaction composition can have a particularly good viscosity.

The halogen-containing silane compound is reacted with at least one hydrogenating agent. A hydrogenating agent is understood here to mean a hydrogen-transferring reducing agent. More particularly, a hydrogenating agent is understood to mean a hydride compound. Particularly good yields result when the hydrogenating agent is selected from the group of compounds consisting of $LiAlH_4$, $NaBH_4$ and i-$Bu_2AlH$. Especially for the hydrogenation of dodecachloroneopentasilane, the highest yields result when the hydrogenating agent used is i-$Bu_2AlH$. In addition, i-$Bu_2AlH$ has the advantage of being usable without the addition of solvent in the case of a desired performance of the reaction in the liquid phase.

Particularly good yields result when the hydrogenating agent is metered in in the reduced state in H equivalent proportions of 1.0 to 1.5 based on the sum total of halogen atoms to be hydrogenated.

The halogen-containing silane is preferably hydrogenated at temperatures of −78 to 300° C. and pressures of 1 mbar to 40 bar. Particular preference is given to hydrogenating the halogen-containing silane at −25° C. to +25° C. and 0.9 to 5 bar.

The at least one halogen-containing silane compound can be used for the hydrogenation without solvent or dissolved or suspended in a solvent. Preferably, since this increases the reaction rate, the halogen-containing silane compound is used without separate addition of a solvent. Further preferably, for the hydrogenation of the halogen-containing silane compound, a hydrogenating agent which is in liquid form in the oxidized and/or reduced state and hence can suspend or dissolve the halogen-containing silane compound is used.

The process according to the invention is a continuous process. In a continuous process, the reactants and any solvents are introduced into the reaction vessel in an uninterrupted manner, i.e. continuously, for example with compressors or pumps. After a particular period, the products formed are withdrawn constantly, i.e. continuously, from the reaction vessel.

For the inventive reaction, it is possible in principle to use any reaction vessel suitable for a continuous reaction procedure. The reaction can be performed in a single reactor or else in a combination of a plurality of the series-connected reactors.

Preferably, the process is performed in such a way that at least two series-connected reactors are used. Thus, it is possible to achieve particularly high yields with simple techniques.

Further preferably, the process, in the case of the use of at least two reactors, is performed in such a way that the molar ratio of reduced to oxidized hydrogenating agent in the first reactor is a value between 0.4 and 0.75, preferably 0.5 and 0.65, more preferably between 0.55 and 0.6. The choice of a lower limit of 0.4, even more of 0.5, very particularly of 0.55, already leads to a satisfactory yield in the first reactor without any disruptive effect from solids present or formed in the reaction. Because of an already satisfactory yield for the first component step, in addition, the conduct of the reaction in the downstream reactor(s) can be kept relatively uncomplicated in technical terms. For upper limits of 0.75, even more 0.65, even better 0.6, the amount of waste heat which arises in the reaction is still efficiently controllable. Moreover, the stated range of 0.4 to 0.75 and, further preferably, the narrow component ranges of 0.5 to 0.65 and even more the component range from 0.55 to 0.6 have the advantage of leading to a particularly low level of by-products overall. More preferably, the process is performed in such a way that the at least one hydrogenating agent is i-Bu$_2$AlH, and the molar ratio of reduced to oxidized i-Bu$_2$AlH in the first reactor therein has a value between 0.5 and 0.65, preferably between 0.55 and 0.6.

Preferably, the first reactor is a continuous stirred tank reactor (CSTR). With such a reactor, it is possible to achieve conversion rates of 50-70 mol % in relation to the hydrogenation of the silane compounds for the molar ratio of reduced to oxidized hydrogenating agent emphasized above as preferred. The stirred tank reactor is further preferably operated with external circulation of the reaction mixture. By means of an external circulation system, the heat of reaction can be removed better and the mass transfer can additionally be accelerated by virtue of the higher flow rate.

The stirred tank reactor may have one or more reactors connected downstream, which have the advantage of increasing the overall yield. Preferably, at least one of the reactors connected downstream of the first reactor is a flow reactor. Preferably, the flow reactor(s) connected downstream comprise at least one tubular reactor, at least one loop reactor, at least one column reactor or a combination thereof. Corresponding reactors are technically simple to manage, have low propensity to faults and have good maintainability. In addition, maximization of the conversion of up to ≥95 mol % yield can be achieved therewith. Preference is given to using a tubular reactor. It can be executed in various ways. It can preferably be executed as an empty tube or as a tube with internals, for example with random packings, static mixers with or without internal heat exchange surfaces or a tube in the form of a helical tube reactor.

The reduction of the oxidized hydrogenating agent can in principle be performed as desired. Preferably, the oxidized hydrogenating agent, especially i-Bu$_2$AlCl formed, can be reacted with sodium hydride or lithium hydride to directly form the reduced hydrogenating agent, or with Na/Mg alloys initially to form an intermediate and subsequently hydrogenated with H$_2$. Methods for this purpose are known to those skilled in the art and are published under L. I. Zalharkin et al., Izvestiya Akademii Nauk SSSR No. 10, pp. 1894-1895, 1961, and also GB 980765 A, U.S. Pat. No. 2,958,703 A, U.S. Pat. No. 3,006,942 A, U.S. Pat. No. 2,838,556 A, U.S. Pat. No. 2,954,388 A and U.S. Pat. No. 3,097,066 A.

The reduction of the hydrogenating agent can be performed up to complete regeneration of the hydrogenating agent. However, the hydrogenating agent need not be reduced up to complete regeneration of the hydrogenating agent, since this entails a high level of apparatus complexity. Preferably, the regeneration of the hydrogenating agent is performed such that the hydrogenating agent is regenerated up to a yield of at least 85 mol % and fresh hydrogenating agent is additionally metered in for further use.

The removal of the oxidized hydrogenating agent, the reduction thereof and the feeding of the product of the reduction reaction (i.e. for feeding of essentially reduced hydrogenating agent) can again itself be effected in a batchwise process or continuously. Preferably, because the overall reaction becomes particularly efficiently controllable thereby, these steps are likewise effected continuously.

In the regeneration of the hydrogenating agent, especially in the case of use of sodium hydride, it is also possible to add an anti-agglomerant or free-flow aid to increase the yield (cf. JP 2000-256367 A).

The process according to the invention for hydrogenating halogen-containing silane compounds can follow particularly efficiently on from a process for synthesizing halogenated silane compounds, in which i) at least one halosilane of the generic formula Si$_n$X$_{2+2}$ (where n≥2, preferably n≥3, and X=F, Cl, Br and/or I) and ii) at least one catalyst selected from the group of the tertiary phosphines PR$_3$, the tertiary amines NR$_3$ and the group of compounds of the generic formula

NRR'$_a$R''$_b$Y$_c$ where a=0 or 1, b=0 or 1, and c=0 or 1, and

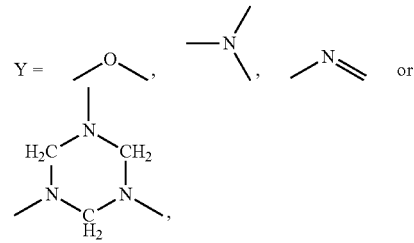

where aa) —R, R' and/or R'' is —C$_1$-C$_{12}$-alkyl, —C$_1$-C$_{12}$-aryl, —C$_1$-C$_{12}$-aralkyl, —C$_1$-C$_{12}$-aminoalkyl, —C$_1$-C$_{12}$-aminoaryl, —C$_1$-C$_{12}$-aminoaralkyl, especially preferably -Ph, -PhCH$_3$, -PhC$_2$H$_5$, -PhC$_3$H$_7$, —CH$_2$(C$_6$H$_4$)CH$_3$, —CH$_2$(C$_6$H$_4$)C$_2$H$_5$, —C$_2$H$_4$(C$_6$H$_4$)C$_2$H$_5$, —C$_2$H$_4$(C$_6$H$_4$)C$_3$H$_7$, —C$_3$H$_6$(C$_6$H$_4$)—C$_3$H$_7$, —C$_6$H$_2$(CH$_3$)$_3$, —C$_6$H$_3$(CH$_3$)$_2$, —C$_8$H$_7$, —C$_8$H$_6$CH$_3$, -PhNR'''R'''', -PhCH$_2$NR'''R'''', -PhC$_2$H$_4$NR'''R'''', -PhC$_3$H$_6$NR'''R'''', —CH$_2$(C$_6$H$_4$)—CH$_2$NR'''R'''', —CH$_2$(C$_6$H$_4$)C$_2$H$_4$NR'''R'''', —C$_2$H$_4$(C$_6$H$_4$)C$_2$H$_4$NR'''R'''', —C$_2$H$_4$(C$_6$H$_4$)C$_3$H$_6$NR'''R'''', —C$_3$H$_6$(C$_6$H$_4$)C$_3$H$_6$NR'''R'''', —CH$_2$NR'''R'''', —C$_2$H$_4$NR'''R'''', —C$_3$H$_6$NR'''R'''',
—C$_4$H$_8$NR'''R'''', —C$_5$H$_{10}$NR'''R'''',
—C$_6$H$_{12}$NR'''R'''', —C$_7$H$_{14}$NR'''R'''',
—C$_8$H$_{16}$NR'''R'''', —C$_9$H$_{18}$NR'''R'''' and/or
—C$_{10}$H$_{20}$NR'''R''''(where R''' and R''''=—C$_1$-C$_{10}$-alkyl, —C$_1$-C$_{10}$-aryl and/or —C$_1$-C$_{10}$-aralkyl),
and/or two or three R, R' and R'' radicals, in the case that c=0, together form a cyclic or bicyclic, heteroaliphatic or heteroaromatic system including N, the cyclic or bicyclic, heteroaliphatic or heteroaromatic system especially preferably being a pyrrolidine, pyrrole, piperidine, pyridine, hexamethyleneimine, azatropylidene or quinoline ring system, with the proviso that at least one R, R' or R'' radical is not —CH$_3$
and/or bb) R and R' and/or R'' (in the case that c=1) is —C$_1$-C$_{12}$-alkylene, —C$_1$-C$_{12}$-arylene, —C$_1$-C$_{12}$-aralkylene, —C$_1$-C$_{12}$-heteroalkylene, —C$_1$-C$_{12}$-heteroarylene, —C$_1$-C$_{12}$-heteroaralkylene and/or —N=, especially preferably —CH$_2$—, —C$_2$H$_4$—, —C$_3$H$_6$—, —C$_4$H$_8$—, —C$_5$H$_{10}$—, —C$_6$H$_{12}$—, —C$_7$H$_{14}$—, —C$_8$H$_{16}$—, —C$_9$H$_{18}$—, —C$_{10}$H$_{20}$—, -Ph-, -PhCH$_2$—, -PhC$_2$H$_4$—, -PhC$_3$H$_6$—, —CH$_2$(C$_6$H$_4$)CH$_2$—, —CH$_2$(C$_6$H$_4$)C$_2$H$_4$—, —C$_2$H$_4$(C$_6$H$_4$)C$_2$H$_4$—, —C$_2$H$_4$(C$_6$H$_4$)C$_3$H$_6$—, —C$_3$H$_6$(C$_6$H$_4$)C$_3$H$_6$—, —C$_6$H(CH$_3$)$_3$—, —C$_6$H$_2$(CH$_3$)$_2$—, —CH=, —CH=CH—, —N=, —N=CH— and/or —CH=N—,
or cc) (in the case that a=b=c=0) R==C—R''' (where R'''=—C$_1$-C$_{10}$-alkyl, —C$_1$-C$_{10}$-aryl and/or —C$_1$-C$_{10}$-aralkyl), are converted to form a mixture comprising at least one halosilane of the generic formula Si$_m$X$_{2m+2}$ (where m>n and X=F, Cl, Br and/or I) and Si$_{m-n}$X$_{2(m-n)+2}$ (where X=F, Cl, Br and/or I).

The present invention further provides the hydridosilane compounds preparable by the process according to the invention, especially the hydridosilanes preparable by the process according to the invention, and for the use thereof for production of semiconductive, electronic or optoelectronic layers.

FIG. 1 shows an illustrative experimental setup.

LIST OF REFERENCE NUMERALS (1) Si$_5$Cl$_{12}$ feed
(2) feed of fresh Dibal-H (i-Bu$_2$AlH)
(3) feed of recycled Dibal-H (i-Bu$_2$AlH)
(4) CSTR
(5) circulation pump
(6) flow tube reactor
(7) short-path evaporator
(8) feed of Dibal-Cl to recycling
(9) feed of crude product to distillation
(10) distillation column 1
(11) low boiler fraction
(12) feed of crude product to 2nd distillation
(13) distillation column 2
(14) product of value
Example:

Preparation of dodecachloroneopentasilane Si$_5$Cl$_{12}$

The preparation of Si$_5$Cl$_{12}$ is effected in batchwise operation in a cone mixer dryer. In the first step, at 20° C. and 1 bar under a protective gas atmosphere, 20 kg of a liquid mixture of perchlorosilanes having predominantly 3 silicon atoms are admixed with 3 kg of hexane and 60 g of diazabicyclo[2.2.2]octane dissolved in 450 g of diethyl ether. The mixture reacts within 40 h to give solid Si$_5$Cl$_{12}$ and the by-product SiCl$_4$. After the reaction step, the low boilers (hexane and diethyl ether) and the SiCl$_4$ by-product are removed from the reaction mixture at 50° C. under reduced pressure (200 to 1 mbar) to obtain 16 kg of Si$_5$Cl$_{12}$.

Preparation of neopentasilane (NPS) and the Thermal Workup Thereof (H Equivalent Content of the Hydrogenating Agent: 1.1)

The hydrogenation of Si$_5$Cl$_{12}$ with diisobutylaluminium hydride is performed in two reaction stages. The first reactor (4, cf. FIG. 1), a continuous stirred tank reactor (CSTR) with forced external circulation (pump, 5), is initially charged with diisobutylaluminium hydride and the recycled diisobutylaluminium hydride (3) is metered in continuously. Thus, the hydrogenating agent (diisobutylaluminium hydride) is metered in constantly in appropriate H equivalent contents (2). The Si$_5$Cl$_{12}$ (1) is metered continuously into the reactor (4) in solid form while keeping the reaction temperature constant at 10° C. The Si$_5$Cl$_{12}$ conversion in this reaction step is about 65%. By means of a fill level regulator in the CSTR (4), a defined volume flow rate is conveyed through a valve into the downstream flow tube reactor (6), where a reaction temperature of 10° C. is likewise set. In the flow tube reactor, a final conversion of 100% Si$_5$Cl$_{12}$ is attained.

In the short-path evaporator (7), the output from the reaction stage is worked up thermally. A large portion of the unconsumed diisobutylaluminium hydride hydrogenating agent and of the depleted diisobutylaluminium hydride hydrogenating agent is removed in the short-path evaporator (7). The top product of the short-path evaporator is purified in the downstream distillation columns. 0.20 kg of pure NPS is obtained per hour.

The hydridosilanes in the distillate are determined qualitatively by GC-MS analysis. The distillate contains hydridosilanes in a proportion of >99.0 area %.

Yield based on weight (kg/h of hydridosilanes as distillate per kg/h of perchlorosilane mixture used): 16.5%.

The unconsumed or depleted hydrogenating agent (8) from the short-path evaporator (7) is treated with NaH (15) and the recycled hydrogenating agent (3) is subsequently returned to the CSTR (4).

The invention claimed is:

1. A continuous process for hydrogenating halogen-containing silane compounds having at least three silicon atoms, comprising:
   (i) continuously converting
      at least one halogen-containing silane compound having at least three silicon atoms and at least one hydrogenating agent
      to form
      at least one hydridosilane compound having at least 3 silicon atoms and an oxidized hydrogenating agent;
   (ii) withdrawing and reducing the oxidized hydrogenating agent, and
   (iii) feeding back the reduced oxidized hydrogenating agent to (i).

2. The process according to claim 1, wherein the halogen-containing silane compound has the generic formula Si$_n$X$_{2n+2}$ where 3≤n≤10 and X=F, Cl, Br, and/or I.

3. The process according to claim 2, characterized in that wherein the halogen-containing silane compound is Si$_5$Cl$_{12}$.

4. The process according to claim 1, wherein the proportion of the at least one halogen-containing silane compound ranges from 10-30% by weight based on the total mass of the components fed in.

5. The process according to claim 1, wherein the hydrogenating agent is selected from the group of compounds consisting of LiAlH$_4$, NaBH$_4$ and i-Bu$_2$AlH.

6. The process according to claim 1, wherein the hydrogenating agent in the reduced state is metered in H equivalent proportions of 1.0 to 1.5 based on the sum total of halogen atoms to be hydrogenated.

7. The process according to claim 1, wherein at least two series-connected reactors are used for the conversion.

8. The process according to claim 7, wherein the molar ratio in the first reactor of reduced to oxidized hydrogenating agent ranges from 0.4 to 0.75.

9. The process according to claim 7, wherein the first of the two or more series-connected reactors is a stirred tank reactor.

10. The process according to claim 7, wherein at least one of the reactors connected downstream of the first reactor is a flow reactor.

11. The process according to claim 1 characterized in that it that follows on from a process for synthesizing halogenated silane compounds in which
   i) at least one halosilane of the generic formula Si$_n$X$_{2n+2}$ where n≥2 and X=F, Cl, Br and/or I and
   ii) at least one catalyst selected from the group of the tertiary phosphines PR$_3$, the tertiary amines NR$_3$ and the group of compounds of the generic formula NRR'$_a$R''$_b$Y$_c$ where a=0 or 1, b=0 or 1, and c=0 or 1, and

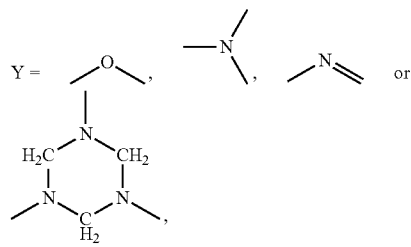

where
aa) R, R' and/or R" is —C$_1$-C$_{12}$-alkyl, —C$_1$-C$_{12}$-aryl, —C$_1$-C$_{12}$-aralkyl, —C$_1$-C$_{12}$-aminoalkyl, —C$_1$-C$_{12}$-aminoaryl, —C$_1$-C$_{12}$-aminoaralkyl, and/or two or three R, R' and R" radicals, in the case that c=0, together form a cyclic or bicyclic, heteroaliphatic or heteroaromatic system including N, with the proviso that at least one R, R' or R" radical is not —CH$_3$
and/or
bb) R and R' and/or R" (in the case that c=1) are —C$_1$-C$_{12}$-alkylene, —C$_1$-C$_{12}$-arylene, —C$_1$-C$_{12}$-aralkylene, —C$_1$-C$_{12}$-heteroalkylene, —C$_1$-C$_{12}$-heteroarylene, —C$_1$-C$_{12}$-heteroaralkylene and/or —N=, or
cc) (in the case that a=b=c=0) R=C—R''' (where R'''=—C$_1$-C$_{10}$-alkyl, —C$_1$-C$_{10}$-aryl and/or —C$_1$-C$_{10}$-aralkyl), are converted to form a mixture comprising at least one halosilane of the generic formula Si$_m$X$_{2m+2}$ (where m>n and X=F, Cl, Br and/or I) and Si$_{m-n}$X$_{2(m-n)+2}$ (where X=F, Cl, Br and/or I).

* * * * *